US012790499B2

(12) United States Patent
Wu et al.

(10) Patent No.: US 12,790,499 B2
(45) Date of Patent: Nov. 10, 2026

(54) ANTIBACTERIAL AND LOW-ADHESION POLYVINYL ALCOHOL COATING

(71) Applicant: Guangzhou University, Guangzhou (CN)

(72) Inventors: Xu Wu, Guangzhou (CN); Junmin Chen, Guangzhou (CN); Danfeng Yu, Guangzhou (CN); Xiubin Xu, Guangzhou (CN)

(73) Assignee: Guangzhou University, Guangzhou (CN)

( * ) Notice: Subject to any disclaimer, the term of this patent is extended or adjusted under 35 U.S.C. 154(b) by 444 days.

(21) Appl. No.: 18/489,004

(22) Filed: Oct. 18, 2023

(65) Prior Publication Data

US 2024/0052179 A1 Feb. 15, 2024

Related U.S. Application Data

(63) Continuation of application No. PCT/CN2021/115225, filed on Aug. 30, 2021.

(30) Foreign Application Priority Data

May 26, 2021 (CN) ........................ 202110577922.9

(51) Int. Cl.
*C09D 129/04* (2006.01)
*C09D 5/14* (2006.01)
(Continued)

(52) U.S. Cl.
CPC ................ *C09D 5/14* (2013.01); *C09D 7/63* (2018.01); *C09D 7/65* (2018.01); *C09D 129/04* (2013.01)

(58) Field of Classification Search
CPC .......... C09D 129/04; C09D 5/14; C09D 7/65; C09D 7/63
See application file for complete search history.

(56) References Cited

U.S. PATENT DOCUMENTS

| | | | | |
|---|---|---|---|---|
| 2011/0045301 | A1* | 2/2011 | Okawara | C08J 7/0423 427/407.1 |
| 2016/0032081 | A1* | 2/2016 | Ieda | C08K 5/101 524/543 |
| 2017/0299779 | A1* | 10/2017 | Mita | B32B 7/12 |

FOREIGN PATENT DOCUMENTS

| | | |
|---|---|---|
| CN | 101293965 A | 10/2008 |
| CN | 102277049 A | 12/2011 |

(Continued)

*Primary Examiner* — Michael L Leonard

(57) ABSTRACT

The present invention provides a method for preparing an antibacterial and low-adhesion cross-linked polyvinyl alcohol coating. A simple two-step method is adopted, wherein polyfunctional isocyanate is first used to strongly cross-link with the hydroxyl group of polyvinyl alcohol, and then a compound with low surface energy such as mono-hydroxyl silicone oil or the like is received in to effectively reduce the surface energy of the surface of the coating; and two structure-function relationships are efficiently synergistic through effective strong cross-linking and regulation of the compound with low surface energy within the system, enabling the strongly cross-linked polyethylene coating to have excellent performance of water adhesion resistance and oil adhesion resistance, and good performance of bacterial adhesion resistance, which is expected to be applied in the fields of materials for antifouling and self-cleaning, liquid transportation and implantation in animal body.

8 Claims, 3 Drawing Sheets

(51) Int. Cl.
*C09D 7/63* (2018.01)
*C09D 7/65* (2018.01)

(56) References Cited

FOREIGN PATENT DOCUMENTS

| | | | |
|---|---|---|---|
| CN | 106280946 | A | 1/2017 |
| CN | 107779031 | A | 3/2018 |
| CN | 110437727 | A | 12/2019 |

* cited by examiner blank glass substrate control Example 1 Example 2 Example 3 blank glass substrate control Example 1

ANTIBACTERIAL AND LOW-ADHESION POLYVINYL ALCOHOL COATING

TECHNICAL FIELD

The present invention belongs to the field of a new polymeric functional material, and more specifically relates to an antibacterial and low-adhesion polyvinyl alcohol coating.

BACKGROUND

In recent years, low-adhesion coatings without sticking to a liquid have broad application prospects in the fields of anti-fouling and self-cleaning, anti-icing, anti-fogging, liquid transportation and drag reduction etc. The low liquid adhesion performance of such materials is affected by the surface morphology and surface chemical composition of the materials. At present, the existing low-adhesion coatings are prepared with complicated conditions and have a certain biotoxicity, which restrict the development and application of such materials. Therefore, proposing a simple, efficient and biocompatible low-adhesion coating needs to be solved urgently.

Regarding the influence of the surface morphology on the low liquid adhesion performance of the material, a relatively typical one is a micro-nano rough surface structure that imitates the surface of lotus leave. With this kind of material, a micro-nano structure can be formed on and imparted to the material surface by assembling fluorine-containing particles of silica, zinc oxide and the like on the material surface. However, this kind of material is not wear-resistant. Additionally, there are also anti-adhesion materials with smooth-surface structures, such as SLIPS, monomolecular layers and polymer coatings. Since SLIPS and monomolecular layers respectively have problems of lubricant loss and non-wear resistance, polymer coatings have more room for development. Regarding polymer coatings, it has been reported that cross-linking in high density can enhance the interactions within molecules and promote the formation of micro and nano pores on the surface, which improves the anti-adhesion performance of the material surface. On the other hand, the anti-adhesion performance can be achieved by physically mixing or chemically bonding low surface energy monomers to change the chemical composition of the material surface. During a curing process of the coating material, functional monomers may spontaneously enrich on the surface to form a low liquid adhesion layer. At the same time, a liquid-solid interface formed from a foreign liquid and the coating surface inhibits the functional molecular chain segment from reconfiguring, which can realize the anti-adhesion for liquid. However, at present, polymer coatings are prepared by using poorly biocompatible and non-degradable film-forming monomers, and have insufficient anti-liquid adhesion performance.

SUMMARY

In order to solve the problems of the existing low-adhesion materials of being complicated for preparation, and being not biocompatible, etc., a primary objective of the present invention is to provide an antibacterial and low-adhesion polyvinyl alcohol coating. A polyvinyl alcohol with good biocompatibility is selected and strongly cross-linked by polyfunctional isocyanate, while a small amount of mono-hydroxy silicone oil is received into the system to impart good low-adhesion performance to a coating. The strong cross-linking enhances an internal interaction force of the coating while imparting a strength to the coating, inhibiting the chemical reconfiguration of functional monomers on the surface, and reducing the interaction between the interface of the coating and foreign substances. A compound with low surface energy is advantageous to regulate the surface energy of the system; efficient coordination of cross-linking and surface energy regulation promotes the coating to exhibit low adhesion for both aqueous and oily liquids, and the coating has good anti-bacterial adhesion performance.

Another objective of the present invention is to provide a method for preparing the above-described antibacterial and low-adhesion polyvinyl alcohol coating.

A further objective of the present invention is to provide an application of the above-described antibacterial and low-adhesion polyvinyl alcohol coating in fields of materials for antifouling and self-cleaning, liquid transportation and implantation in animal body.

The present invention provides an antibacterial and low-adhesion polyvinyl alcohol coating, comprising the following raw materials in terms of weight percentage:

| | |
|---|---|
| polyvinyl alcohol | 25%-30%; |
| a cross-linking agent | 65%-70%; |
| a compound with low surface energy | 1%-5%; and |
| dibutyltin dilaurate | 0%-0.5% with 0 excluded. |

Further, the cross-linking agent is at least one selected from the group consisting of hexamethylene diisocyanate, isophorone diisocyanate and hexamethylene diisocyanate trimer.

Further, the compound with low surface energy is selected from organosilicon compounds, and still further, the organosilicon compound is at least one of monohydroxy-terminated silicone oils having average molecular weights of 1000, 3000, 5000 and 10000.

Further, the polyvinyl alcohol is prepared into a solution with a mass fraction of 0%-10% using a hydrophilic solvent, and the mass fraction is not 0%; and still further the mass fraction is 4%-6%. Furthermore, the hydrophilic solvent is an amide solvent, and is specifically at least one of N,N-dimethylformamide and N,N-dimethylformamide.

Further, the cross-linking agent, the compound with low surface energy and a catalyst are dispersed by selecting a complex solvent of a ketone solvent and an amide solvent. The ketone solvent is at least one of acetone and butanone etc.; the amide solvent is at least one of N,N-dimethylformamide and N,N-dimethylformamide; and the volume ratio of the amide solvent to the ketone solvent is (10-15):1.

Further, the prepolymer solution formed by the raw materials for the antibacterial and low-adhesion polyvinyl alcohol coating has a solid content of 5%-10%.

The present invention provides a method for preparing the antibacterial and low-adhesion cross-linked polyvinyl alcohol coating, comprising the following steps:

(1) dispersing a cross-linking agent, a compound with low surface energy and a catalyst in a complex solvent to perform a reaction;

(2) subsequently continuing to add a polyvinyl alcohol solution, adjusting a solid content to 5%-10%, and stirring evenly to obtain a prepolymer solution; and (3) finally taking the prepolymer solution to coat on a surface of a substrate, and curing to obtain the antibacterial and low-adhesion cross-linked polyvinyl alcohol coating.

A time for the reaction in the step (1) is 12-24 h.

The substrate in the step (3) is tinplate, glass sheet, PET 316 stainless steel or the like. The curing is performed by heating at 100-140° C. for 2-8 h.

The antibacterial and low-adhesion polyvinyl alcohol coating has performances of water adhesion resistance, oil adhesion resistance and bacterial adhesion resistance, and can be applied in fields of materials for antifouling and self-cleaning, liquid transportation and implantation in animal body.

Beneficial Effects

Compared with the prior art, the antibacterial and low-adhesion polyvinyl alcohol coating prepared in the present invention has the following technical effects:

(1) The method for preparing the antibacterial and low-adhesion polyvinyl alcohol coating is simple, low in energy consumption, and suitable for industrial production.

(2) The antibacterial and low-adhesion cross-linked polyvinyl alcohol coating has strong cross-linking and good adhesion to the substrate.

(3) The polyvinyl alcohol coating has excellent flexibility, and could be infinitesimally affected by the deformation of the substrate.

(4) The antibacterial and low-adhesion polyvinyl alcohol coating has good transparency.

(5) The antibacterial and low-adhesion polyvinyl alcohol coating has excellent performance of water adhesion resistance and oil adhesion resistance, and has good performance of bacterial adhesion resistance.

DETAILED DESCRIPTION OF EMBODIMENTS

Specific Examples of the present invention are disclosed below, and the technical solutions of the present invention will be further described in detail in combination with Examples, however, the present invention is not limited by these Examples.

An antibacterial and low-adhesion polyvinyl alcohol coating in the present invention is prepared with polyvinyl alcohol, a cross-linking agent, a compound with low surface energy, and a catalyst, and specifically comprises the following raw materials in terms of weight percentage:

| | |
|---|---|
| polyvinyl alcohol | 20%-25%; |
| a cross-linking agent | 65%-70%; |
| a compound with low surface energy | 1%-4.5%; and |
| a catalyst | 0%-0.5%. |

The specific substances and the amounts used for each raw material are detailed in Tables 1-3.

Figure 1:
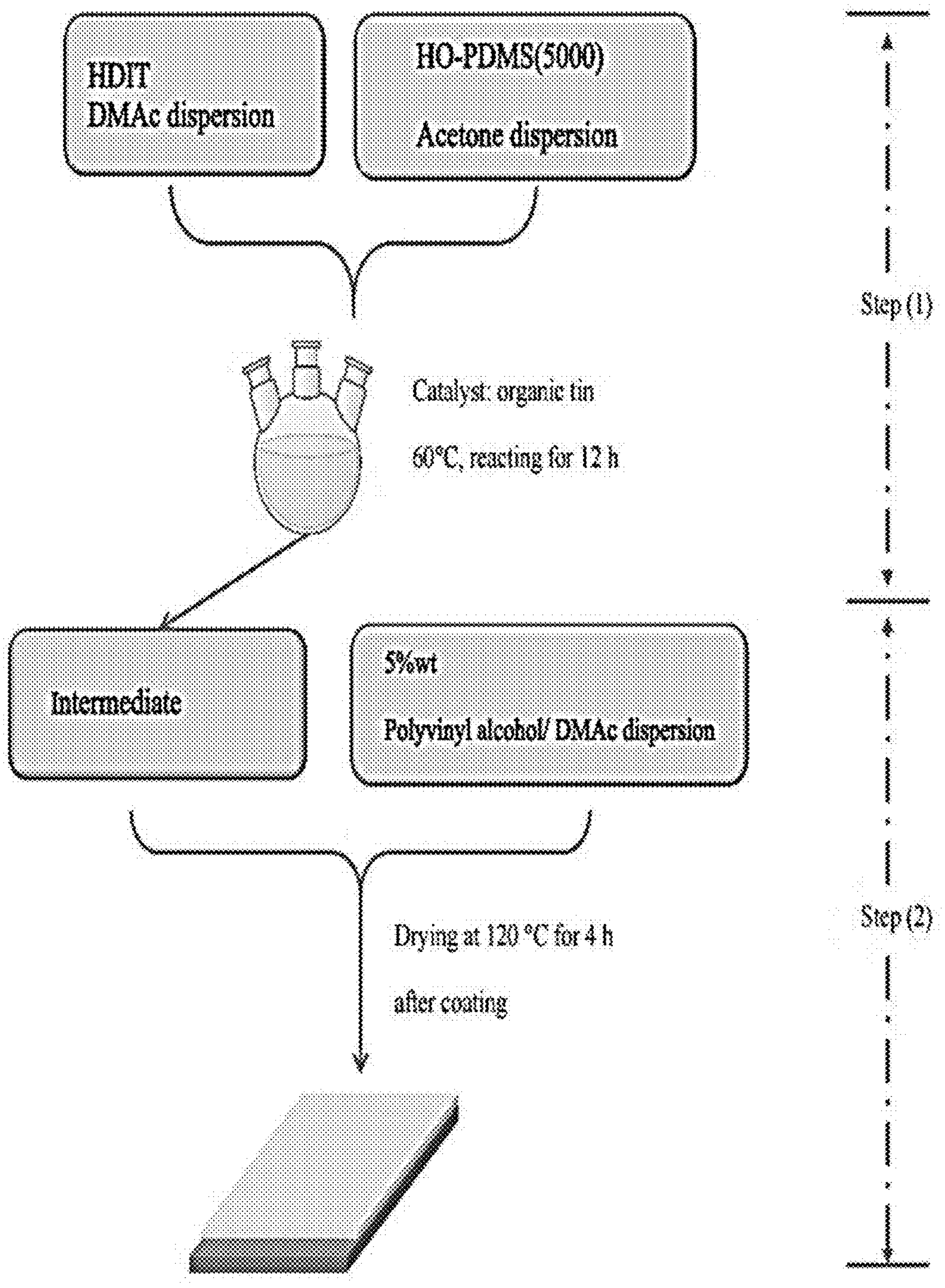
FIG. 1 is a schematic diagram for the preparation process of an antibacterial and low-adhesion cross-linked polyvinyl alcohol coating.

The antibacterial and low-adhesion polyvinyl alcohol coating in the present invention was prepared as follows (seeing FIG. 1):

(1) A cross-linking agent [preferably hexamethylene diisocyanate trimer (HDIT)], a compound with low surface energy [preferably monohydroxy silicone oil having a molecular weight of 5000 (PDMS-OH-5000)] and dibutyltin dilaurate were dispersed in a complex solvent [preferably acetone and N,N-dimethylacetamide (DMAc)], and reacted for 12-24 h.

The cross-linking agent, the compound with low surface energy, the catalyst and the solvent were added in a three-neck flask and mixed evenly. The temperature of the reaction system was raised to 60-80° C., preferably 60° C., and a reaction precursor was formed after reacting at a constant temperature for 12 h.

(2) Subsequently, a polyvinyl alcohol solution with a mass fraction of 0%-10%, preferably 5% was continued to be added, a solid content was adjusted to 5%-10%, and stirring was performed evenly to obtain a prepolymer solution.

(3) Finally, the prepolymer solution was taken to coat on tinplate, glass sheet, PET and 316 stainless steel, and dried at 120° C. for 4 h, to obtain the antibacterial and low-adhesion cross-linked polyvinyl alcohol coating.

Examples 1-3

The compositions of each raw material in Examples 1-3 respectively correspond to Tables 1-3.

TABLE 1

Composition of the raw materials for the antibacterial and low-adhesion polyvinyl alcohol coating in Example 1

| Example 1 Silicon content 2%, solid content 10% | | | Mass/g |
|---|---|---|---|
| Step (1) | Cross-linking agent | HDIT | 1.67 |
| | Compound with low surface energy | PDMS-OH-5000 | 0.05 |
| | Solvent 1 | Acetone | 0.9 |
| | | DMAc | 9.6 |
| Step (2) | Monomer | Polyvinyl alcohol | 0.5 |
| | Solvent 2 | DMAc | 9.5 |

TABLE 2

Composition of the raw materials for the antibacterial and low-adhesion polyvinyl alcohol coating in Example 2

| Example 2 Silicon content 5%, solid content 10% | | | Mass/g |
|---|---|---|---|
| Step (1) | Cross-linking agent | HDIT | 1.67 |
| | Compound with low surface energy | PDMS-OH-5000 | 0.125 |
| | Solvent 1 | Acetone | 0.9 |
| | | DMAc | 9.6 |
| Step (2) | Monomer | Polyvinyl alcohol | 0.5 |
| | Solvent 2 | DMAc | 9.5 |

TABLE 3

| Composition of the raw materials for the antibacterial and low-adhesion polyvinyl alcohol coating in Example 3 | | | |
|---|---|---|---|
| Example 3 Silicon content 2%, solid content 5% | | | Mass/g |
| Step (1) | Cross-linking agent | HDIT | 1.67 |
| | Compound with low surface energy | PDMS-OH-5000 | 0.05 |
| | Solvent 1 | Acetone | 2.8 |
| | | DMAc | 30 |
| Step (2) | Monomer | polyvinyl alcohol | 0.5 |
| | Solvent 2 | DMAc | 9.5 |

Testing Results

Figure 2:
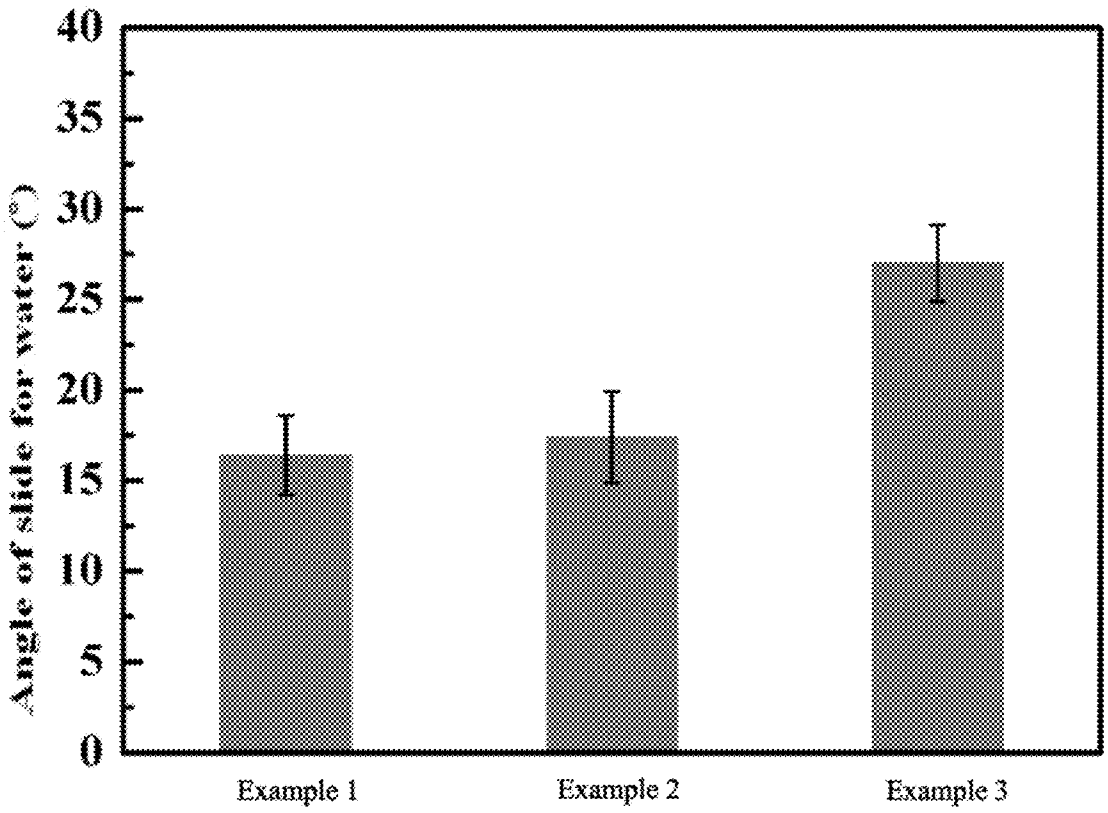
FIG. 2 is a diagram for the angles of slide for water of Examples 1-3.

1. Test for Angle of Slide for Water of the Antibacterial and Low-Adhesion Polyvinyl Alcohol Coating FIG. 2 shows the test for angles of slide for water of the coatings composed of different raw materials in Examples 1-3. By comparing Example 1 and Example 2, it can be seen that the increase in content of silicone oil has little effect on the performance and even slightly decreases the performance. This is attributed to the fact that more content of silicone oil makes it easier to form macroscopic separate phases within the coating system, and such separate phases are not conducive to the migration of chain segments of silicone oil to the interface when the coating is in contact with foreign substances, thus reducing its anti-adhesion performance.

Additionally, it can be seen from the comparison between Example 1 and Example 3 that the angle of slide for water increases significantly with the decrease of solid content, which is attributed to the fact that the thickness of the formed film becomes smaller and the functional monomers with low surface energy are fewer while the solid content is smaller during the coating process, thus reducing the lyophobic ability of the surface.

Figure 3:
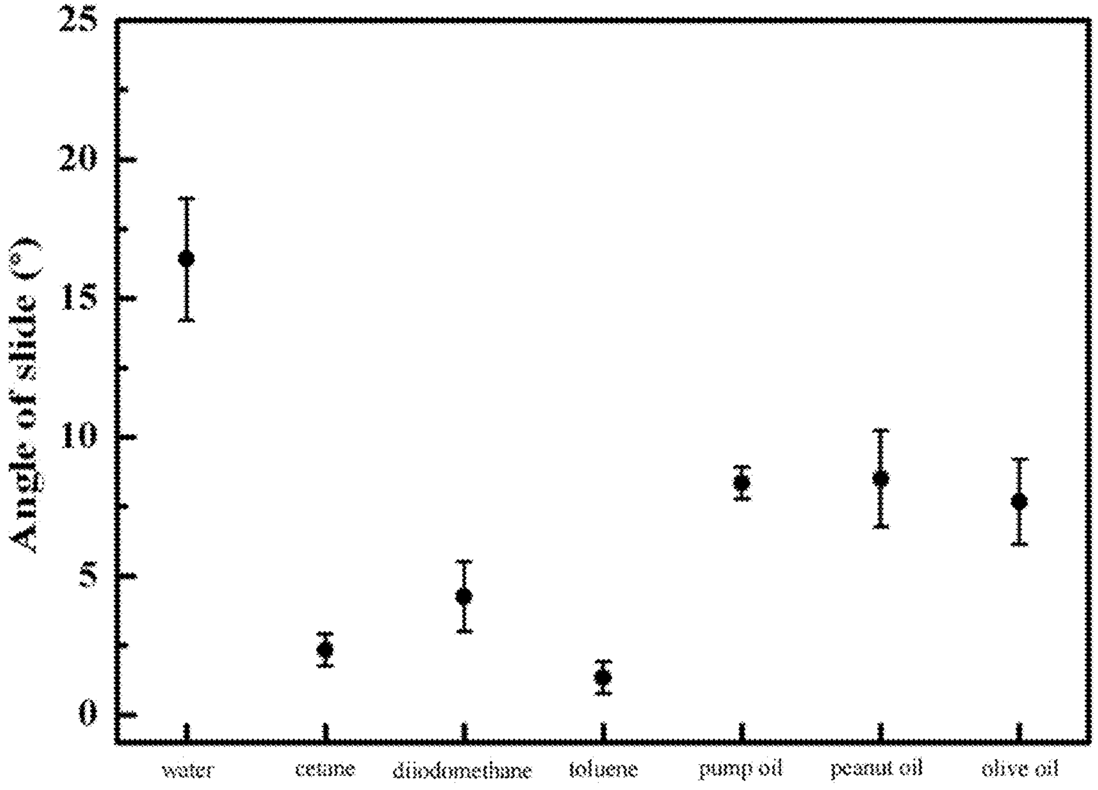
FIG. 3 is a diagram for the angles of slide for water and oil of Example 1.

2. Test for Angle of Slide for Oil of the Antibacterial and Low-Adhesion Polyvinyl Alcohol Coating FIG. 3 shows the angles of slide for water and oil in Example 1, it can be clearly seen that the cross-linked polyvinyl alcohol coating has excellent performances of water adhesion resistance and oil adhesion resistance, in which the angles of slide for daily water, vegetable oil and pump oil are lower than 15°, while those of toluene, cetane and diiodomethane is even lower than 5°, indicating that the coating can be applied in the fields of materials for antifouling as well as self-cleaning and liquid transportation.

Figure 4:
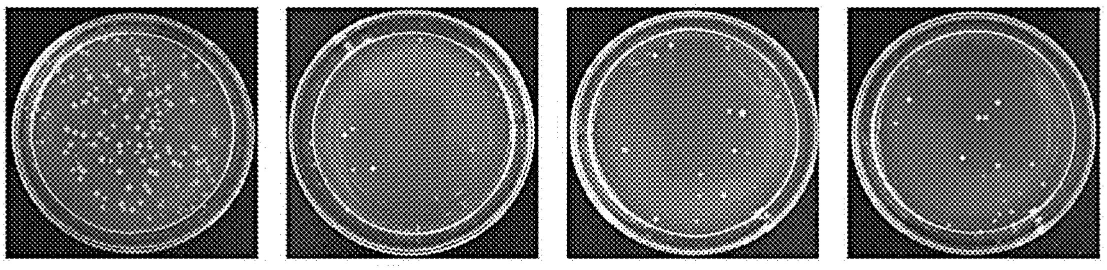
FIG. 4 is a diagram for the antibacterial performance of Examples 1-3.

3. Antibacterial Test for the Antibacterial and Low-Adhesion Polyvinyl Alcohol Coating FIG. 4 shows the test results for Examples 1-3 and a blank glass substrate. Four 1 cm×1 cm samples were inoculated and incubated with 1 mL of a bacterium solution of *Escherichia coli* (concentration of the bacterium solution: $10^6$ bacteria/mL) in a test tube filled with PBS solution for four hours, and then the residual bacterium solution on a surface of the inoculated samples was rinsed with 2 mL PBS solution. The samples were sonicated at 40 kHz for 10 min, and sonicated at 40 kHz for 10 min. After quantitative dilution of the sonicated PBS solution, 0.1 mL of the diluted PBS solution was taken and incubated in the medium at a constant temperature of 37° C. to explore abilities for resisting bacterial adhesion of the samples.

Figure 5:
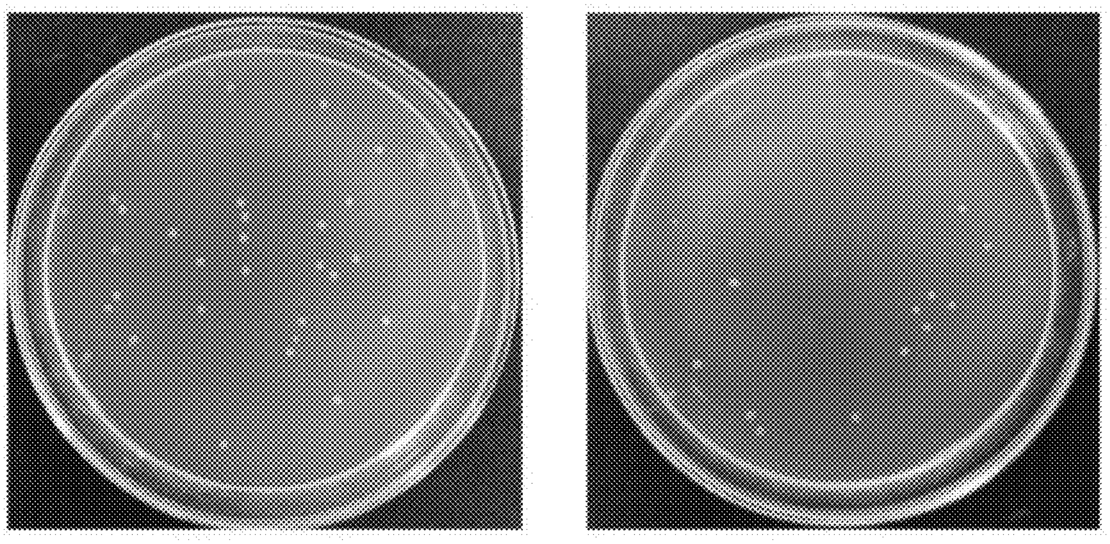
FIG. 5 is a diagram for the antibacterial performance of Example 1.

FIG. 5 shows the test results of Example 1 and the blank glass substrate. Two 1 cm×1 cm samples were inoculated and incubated with 50 μL of a bacterium solution of *Escherichia coli* (concentration of the bacterium solution: $10^8$ bacteria/mL) in a test tube filled with a nutrient broth solution (the *Escherichia coli* will reach a peak value in the nutrient broth) for twenty-four hours, and then the residual bacterium solution on a surface of the inoculated samples was rinsed with 2 mL PBS solution. The samples were then placed in 1 mL of sterile PBS and sonicated at 40 kHz for 10 min. After quantitative dilution of the sonicated PBS solution, 0.1 mL of the diluted PBS solution was taken and incubated in the medium at a constant temperature of 37° C. to further explore abilities for resisting bacterial adhesion of the samples.

By counting the number of *Escherichia coli* on the surface of the culture medium, it can be seen from the comparison that Examples 1-3 in FIG. 4 have a lower relative colony count and a relative antibacterial rate of about 95% compared to the blank glass substrate, after soaking in the bacterium solution for four hours, indicating that the low-adhesion polyvinyl alcohol coating has good antibacterial performance. Relative to FIG. 4, FIG. 5 further increases the concentration of the bacterium solution and extends the soaking time, and the relative antibacterial rate is about 54% after twenty-four hours of soaking, which still has some antibacterial performance. This is attributed to the presence of molecular brushes of silicone oil on the surface of the coating, the surface has low surface energy, and it is difficult for the bacterial surface to interact with the strongly cross-linked polyvinyl alcohol surface, thus reducing bacterial adhesion.

The invention claimed is:

1. A method for preparing an antibacterial and low-adhesion cross-linked polyvinyl alcohol coating, characterized in that: it comprises the following steps:

(1) dispersing a cross-linking agent, a compound with low surface energy and a catalyst in a complex solvent to perform a reaction; wherein the catalyst is dibutyltin dilaurate;

(2) subsequently continuing to add polyvinyl alcohol, adjusting a solid content to 5%-10%, and stirring evenly to obtain a prepolymer solution; and (3) finally taking the prepolymer solution to coat on a surface of a substrate, and curing to obtain the antibacterial and low-adhesion cross-linked polyvinyl alcohol coating; and wherein the antibacterial and low-adhesion cross-linked polyvinyl alcohol coating comprises the following raw materials in terms of weight percentage:

| | |
|---|---|
| polyvinyl alcohol | 25%-30%; |
| a cross-linking agent | 65%-70%; |
| a compound with low surface energy | 1%-5%; and |
| dibutyltin dilaurate | 0%-0.5% with 0 excluded. |

2. The method according to claim 1, characterized in that: a time for the reaction in the step (1) is 12-24 h; the substrate in the step (3) is tinplate, glass sheet, PET or 316 stainless steel; and the curing is performed by heating at 100-140° C. for 2-8 h.

3. The method according to claim 1, wherein the cross-linking agent is at least one selected from the group consisting of hexamethylene diisocyanate, isophorone diisocyanate and hexamethylene diisocyanate trimer.

4. The method according to claim 1, wherein the compound with low surface energy is selected from organosilicon compounds.

5. The method according to claim 4, wherein the organosilicon compound is at least one of monohydroxy-terminated silicone oils having average molecular weights of 1000, 3000, 5000 and 10000.

6. The method according to claim 1, wherein the polyvinyl alcohol is prepared into a solution with a mass fraction of 0%-10% using a hydrophilic solvent, and the mass fraction is not 0; the hydrophilic solvent is an amide solvent; the cross-linking agent, the compound with low surface energy and the catalyst are dispersed by using the complex solvent of a ketone solvent and an amide solvent.

7. The method according to claim 6, wherein the ketone solvent is at least one of acetone and butanone; the amide solvent is N,N-dimethylformamide; and the volume ratio of the amide solvent to the ketone solvent is (10-15):1.

8. The method according to claim 1, wherein a prepolymer solution formed by the raw materials for the antibacterial and low-adhesion cross-linked polyvinyl alcohol coating has a solid content of 5%-10%.

* * * * *